United States Patent
Ji et al.

(10) Patent No.: US 11,711,281 B2
(45) Date of Patent: Jul. 25, 2023

(54) METHODS AND NETWORK DEVICES FOR DETECTING AND RESOLVING ABNORMAL ROUTES

(71) Applicant: Telefonaktiebolaget LM Ericsson (publ), Stockholm (SE)

(72) Inventors: Junjie Ji, Beijing (CN); Wei Xu, Beijing (CN); Mingliang Huang, Beijing (CN); Yun Tian, Beijing (CN); Chao Fu, Beijing (CN)

(73) Assignee: Telefonoktiebolagget LM Ericsson (Publ), Stockholm (SE)

( * ) Notice: Subject to any disclaimer, the term of this patent is extended or adjusted under 35 U.S.C. 154(b) by 91 days.

(21) Appl. No.: 17/262,454

(22) PCT Filed: Jul. 24, 2019

(86) PCT No.: PCT/CN2019/097424
§ 371 (c)(1),
(2) Date: Jan. 22, 2021

(87) PCT Pub. No.: WO2020/020204
PCT Pub. Date: Jan. 30, 2020

(65) Prior Publication Data
US 2021/0234777 A1    Jul. 29, 2021

(30) Foreign Application Priority Data

Jul. 24, 2018 (CN) .......................... 201810818559.3

(51) Int. Cl.
*H04L 43/0805* (2022.01)
*H04L 41/12* (2022.01)
(Continued)

(52) U.S. Cl.
CPC .......... *H04L 43/0805* (2013.01); *H04L 41/12* (2013.01); *H04L 41/14* (2013.01);
(Continued)

(58) Field of Classification Search
CPC ..... H04L 43/0805; H04L 41/12; H04L 45/28; H04L 45/02; H04L 43/10; H04L 41/14; H04L 41/0863
See application file for complete search history.

(56) References Cited

U.S. PATENT DOCUMENTS 7,382,769 B1 *  6/2008  Rijsman .............. H04L 63/1441
                                                    370/352
7,983,175 B2 *  7/2011  Gale .................. H04L 41/0677
                                                    370/242
(Continued)

FOREIGN PATENT DOCUMENTS

CN        1764122 A      4/2006
CN      101150455 A      3/2008
(Continued)

OTHER PUBLICATIONS

Yang, Hongkun and Simon Lam, "Collaborative Verification of Forward and Reverse Reachability in the Internet Data Plane", 2014, IEEE, 2014 IEEE 22nd International Conference on Network Protocols. (Year: 2014).*

(Continued)

*Primary Examiner* — Nam T Tran
(74) *Attorney, Agent, or Firm* — Christopher & Weisberg, P.A.

(57) ABSTRACT

The embodiments herein relate to a method in a network device. In one embodiment, there proposes a method in a network device, comprising: determining a classification to which a route belongs based on one or more classification criteria; determining, based on the classification to which the route belongs, a detection mechanism for detecting whether the route is an abnormal route; detecting whether the route is an abnormal route using the determined detection mechanism. With the embodiments herein, the abnormal routes, (Continued)

especially the black hole routes, can be automatically detected and resolved in real time.

19 Claims, 5 Drawing Sheets

(51) Int. Cl.
    *H04L 41/14*      (2022.01)
    *H04L 45/02*      (2022.01)
    *H04L 45/28*      (2022.01)
    *H04L 43/10*      (2022.01)

(52) U.S. Cl.
    CPC .............. *H04L 43/10* (2013.01); *H04L 45/02* (2013.01); *H04L 45/28* (2013.01)

(56) References Cited

U.S. PATENT DOCUMENTS

| | | | |
|---|---|---|---|
| 8,503,329 | B2 | 8/2013 | Mullooly et al. |
| 8,949,458 | B1* | 2/2015 | Rijsman .............. H04L 63/1441 709/224 |
| 9,882,784 | B1* | 1/2018 | Lotfi ....................... H04L 67/10 |
| 10,103,981 | B2* | 10/2018 | Pignataro ................ H04L 45/22 |
| 2006/0031575 | A1* | 2/2006 | Jayawardena .......... H04L 29/06 709/239 |
| 2006/0047807 | A1* | 3/2006 | Magnaghi ........... H04L 41/0677 709/224 |
| 2007/0014232 | A1* | 1/2007 | Yasuie ................ H04L 41/0677 370/216 |
| 2007/0058624 | A1* | 3/2007 | Ma .......................... H04L 45/18 370/389 |
| 2007/0115840 | A1* | 5/2007 | Feick ...................... H04L 43/10 370/252 |
| 2007/0153763 | A1* | 7/2007 | Rampolla ........... H04L 63/1466 370/351 |
| 2008/0298800 | A1* | 12/2008 | Naito ...................... H04L 45/00 398/16 |
| 2010/0135304 | A1* | 6/2010 | Mulligan .............. H04L 45/028 370/395.3 |
| 2011/0134830 | A1* | 6/2011 | Lin ......................... H04L 45/24 370/328 |
| 2011/0185235 | A1* | 7/2011 | Iizuka ................ H04L 43/0882 714/E11.02 |
| 2015/0026794 | A1* | 1/2015 | Zuk ......................... H04L 69/22 726/13 |
| 2015/0278287 | A1* | 10/2015 | Takaishi .................. G06F 11/28 707/690 |
| 2016/0065423 | A1* | 3/2016 | Zhang ..................... H04L 43/10 370/235 |
| 2017/0041161 | A1* | 2/2017 | Kaku .................. H04L 43/0847 |
| 2017/0195218 | A1* | 7/2017 | Schrum, Jr. ............. H04L 45/02 |
| 2018/0013787 | A1* | 1/2018 | Jiang ....................... H04L 29/06 |
| 2018/0367548 | A1* | 12/2018 | Stokes, III .......... H04L 63/1466 |
| 2021/0234777 | A1* | 7/2021 | Ji ........................ H04L 43/0805 |

FOREIGN PATENT DOCUMENTS

| | | |
|---|---|---|
| CN | 101483547 A | 7/2009 |
| CN | 102281165 A | 12/2011 |
| CN | 107222359 A | 9/2017 |
| CN | 108881295 A | 11/2018 |
| EP | 3229408 A1 | 10/2017 |

OTHER PUBLICATIONS

Asati, Rajiv, et al., "BGP/MPLS Traffic Blackhole Avoidance," Internet Engineering Task Force (IETF), draft-asati-bgp-mpls-blackhole-avoidance-00.txt. Network Working Group, Feb. 23, 2007, 16 pages.
Baker, Fred, et al., "Ingress Filtering for Multihomed Networks," Internet Engineering Task Force (IETF), Network Working Group, Request for Comments: 3704, Mar. 2004, 16 pages.
Cimpanu, Catalin, "Google Error Causes Widespread Internet Outage in Japan," BleepingComputer, Aug. 27, 2017, 9 pages, https://www.bleepingcomputer.com/news/technology/google-error-causes-widespread-internet-outage-in-japan/.
King, Thomas, et al., "BLACKHOLE Community," Internet Engineering Task Force (IETf), Request for Comments 7999, Oct. 2016, 9 pages.
Kumari, Warren, et al., Remote Triggered Black Hole Filtering with Unicast Reverse Path Forwarding (uRPF), Internet Engineering Task Force (IETF), Network Working Group, Request for Comments: 5635, Aug. 2009, 15 pages.
Rekhter, Yakov, et al., "A Border Gateway Protocol 4 (BGP-4)," Internet Engineering Task Force (IETF), Network Working Group, Request for Comments: 4271, Jan. 2006, 104 pages.
Turk, Doughan, "Configuring BGP to Block Denial-of-Service Attacks," Internet Engineering Task Force (IETF), Network Working Group, Request for Comments: 3882, Sep. 2004, 8 pages.
Villamizar, Curtis, et al., "BGP Route Flap Damping," Internet Engineering Task Force (IETF), Network Working Group, Request for Comments: 2439, Nov. 1998, 37 pages.
International Search Report and Written Opinion for International Patent Application No. PCT/CN2019/097424, dated Sep. 27, 2019, 11 pages.
First Office Action for Chinese Patent Application No. 201810818559.3, dated Aug. 19, 2019, 28 pages.
Third Office Action for Chinese Patent Application No. 201810818559.3, dated Feb. 3, 2020, 31 pages.
Notice of Reexamination for Chinese Patent Application No. 201810818559.3, dated Jan. 13, 2021, 14 pages.
Second Office Action for Chinese Patent Application No. 201810818559.3, dated Nov. 14, 2019, 25 pages.

\* cited by examiner

METHODS AND NETWORK DEVICES FOR DETECTING AND RESOLVING ABNORMAL ROUTES

RELATED APPLICATION

This application is a 35 U.S.C. § 371 national phase filing of International Application No. PCT/CN2019/097424, filed Jul. 24, 2019, which claims priority to Chinese Application Serial Number 201810818559.3 filed Jul. 24, 2018, the entire contents of which are incorporated herein by reference.

TECHNICAL FIELD

Embodiments of the present disclosure generally relate to network communications and, more particularly, to methods and network devices for detecting and resolving abnormal routes.

BACKGROUND

This section is only for the purpose of facilitating a better understanding of the present disclosure. Therefore, the statements in this section should not be construed as an admission of which contents are prior art or which contents are not prior art.

In a communication network, black holes refer to places in the network where incoming or outgoing traffic is silently discarded (or "dropped"), without informing the source that the data did not reach its intended recipient. There are two types of black holes. One type is well-meaning with next-hop being configured as null or 0 by administrators, which can avoid loop or drop the damaged traffic. Another type of black hole is vicious. It may be an attack or introduced by misconfigurations or routing protocols themselves. Herein, it is the second type of black holes which is addressed to.

Black holes, especially Border Gateway Protocol, BGP, black holes can cause the traffic to be dropped and thus many services breakdown. It perplexes the Internet for so many years. For example, in 2017, an error by Google's engineer's wrong configuration leads an incident which generates about 135,000 black holes, and nearly 8 million Internet connections are affected. In Japan, this resulted in many online services breakdown. Users couldn't access online banking portals, reservation systems, government portals, and so on. Furthermore, users outside Japan couldn't connect to various online portals hosted in the country, such as the Nintendo networks or online marketplaces. This incident lasted about one hour and caused mess and loss.

Currently, there are some solutions addressed to BGP black holes. The Request For Comments (RFC) 3704 and RFC 5635 published by the Internet Engineering Task Force (IETF) present a destination-based and source-based remote triggered black hole filtering which checks routes hop by hop on every node. RFC3882 and RFC7999 define a new "BLACKHOLE" community attribute with which to share the black holes among BGP neighbors. The Draft "draft-asati-bgp-mpls-blackhole-avoidance-00.txt" published by IETF proposes a framework to make BGP guarantee the Multi-protocol Label Switching, MPLS, path availability to the "NEXT HOP".

SUMMARY

This section is provided to introduce a selection of concepts that are further described below in the Detailed Description in a simplified form. This section is not intended to identify key features or essential features of the claimed subject matter, and is not intended to limit the scope of the claimed subject matter.

One of the objectives of the present disclosure is to provide an improved solution for detecting and resolving abnormal routes.

According to an aspect of the disclosure, a method in a network device is provided. The method comprises determining a classification to which a route belongs based on one or more classification criteria. The method also comprises determining, based on the classification to which the route belongs, a detection mechanism for detecting whether the route is an abnormal route. The method further comprises detecting whether the route is an abnormal route using the determined detection mechanism. In an embodiment, the method may further comprise performing one or more predetermined operations to resolve the abnormal route, upon detecting that the route is an abnormal route and/or re-detecting at a predetermined time interval whether the route is an abnormal route, upon detecting that the route is not an abnormal route.

According to the above aspect, an abnormal route, especially a black hole route, can be automatically detected and resolved in real time.

In an embodiment of the present disclosure, the method may further comprise advertising the route to an external device, upon detecting that the route is not an abnormal route.

In an embodiment of the present disclosure, the route is generated by the network device or received from an external device.

In an embodiment of the present disclosure, the one or more classification criteria are one or more of: a route filtering policy, a route origin, a route type, a trust rating, and a self-defined classification criterion.

In an embodiment of the present disclosure, the determined detection mechanism may be one of: detecting a reachability of the route using an Internet packet explorer PING; detecting a reachability of the route using a trace route; detecting a reachability of the route for a destination of the route by using a real traffic or by simulating the real traffic; and a self-defined detection mechanism.

In an embodiment of the present disclosure, detecting a reachability of the route for a destination of the route by using a real traffic or by simulating the real traffic may comprise sending a real or simulated connection establishment request to the destination of the route. This detecting may further comprise determining the reachability of the route according to whether a connection can be established with the destination.

In an embodiment of the present disclosure, performing one or more predetermined operations may comprise one or more of: raising an alarm to an administrator; downgrading the trust rating of the route; performing a rollback operation; reporting the originator of the route to an external device; notifying the external device to take a predetermined action; and performing a self-defined operation.

In an embodiment of the present disclosure, performing the rollback operation may comprise one or more of: uninstalling the route from a forwarding information base, FIB; withdrawing an advertisement of the route; rolling back a misconfiguration which leads to the route; rolling back the network device to a previous healthy state; and performing a self-defined rollback operation.

In an embodiment of the present disclosure, the predetermined action may comprise one or more of: deleting the route at the external device; notifying, by the external device, the neighbor of the external device to delete the route; reporting, by the external device, the route to an administrator of the external device; and performing a self-defined action.

In an embodiment of the present disclosure, the route filtering policy may comprise: a prefix filtering; a route-map filtering; an access-list filtering; an as-path filtering; and a self-defined filtering.

In an embodiment of the present disclosure, the route origin may comprise: Interior Gateway Protocol, IGP; External Gateway Protocol, EGP; and a protocol introduced from other routing protocols via a route redistribution.

In an embodiment of the present disclosure, the route type may comprise: a connected route; a static route; a default route; an Open Shortest Path First Version Two,OSPFv2, route; an Open Shortest Path First Version Three, OSPFv3, route; a Routing Information Protocol, RIP, route; a Routing Information Protocol next generation, RIPng, route; an Intermediate System to Intermediate System, ISIS, route; an Internal Gateway Routing Protocol, IGRP, route; an Enhanced Internal Gateway Routing Protocol, EIGRP, route; and a Border Gateway Protocol, BGP, route.

In an embodiment of the present disclosure, the trust rating may be obtained from a route dampening mechanism.

In an embodiment of the present disclosure, the abnormal route may be a black hole route.

In an embodiment of the present disclosure, the network device may be one of the following deployed with BGP: a router; a switch; a server; and a base station.

According to another aspect of the present disclosure, a network device is provided. The network device may comprise at least one processor and at least one memory containing instructions. The instructions may be executable by the at least one processor, whereby the network device is operable to determine a classification to which a route belongs based on one or more classification criteria. The network device is further operable to determine, based on the classification to which the route belongs, a detection mechanism for detecting whether the route is an abnormal route. The network device is further operable to detect whether the route is an abnormal route using the determined detection mechanism. In an embodiment, the network device may be further operable to perform one or more predetermined operations to resolve the abnormal route, upon detecting that the route is an abnormal route. The network device may be further operable to re-detect at a predetermined time interval whether the route is an abnormal route, upon detecting that the route is not an abnormal route.

In an embodiment of the present disclosure, the network device may be operable to perform the method according to the above aspect.

According to another aspect of the present disclosure, a computer program product is provided. The computer program product contains instructions which, when executed by at least one processor, cause the at least one processor to perform the method according to the above aspect.

According to another aspect of the present disclosure, a computer readable storage medium is provided. The computer readable storage medium contains instructions which, when executed by at least one processor, cause the at least one processor to perform the method according to the above aspect.

According to another aspect of the present disclosure, a network device is provided. The network device may comprise a classification module for determining a classification to which a route belongs based on one or more classification criteria. The network device may further comprise a detection mechanism determining module for determining, based on the classification to which the route belongs, a detection mechanism for detecting whether the route is an abnormal route. The network device may further comprise a detecting module for detecting whether the route is an abnormal route using the determined detection mechanism. In an embodiment, the network device may further comprise an abnormality resolving module for performing one or more predetermined operations to resolve the abnormal route, upon detecting that the route is an abnormal route. The network device may further comprise a re-detecting module for re-detecting at a predetermined time interval whether the route is an abnormal route, upon detecting that the route is not an abnormal route.

BRIEF DESCRIPTION OF THE DRAWINGS

These and other objects, features and advantages of the present invention will become apparent from the following detailed description of the illustrative embodiments of the present disclosure, taken together with the accompanying drawings, in which.

DETAILED DESCRIPTION

For the purpose of illustration, some details are set forth in the following description, so as to provide a thorough understanding of the disclosed embodiments. However, it will be apparent to those skilled in the art that the embodiments may be practiced without the specific details or by using equivalent configurations.

Nowadays, the BGP protocol (see e.g., RFC4271) is the protocol used for Inter-Autonomous-System connectivity. For example, BGP has been deployed in the cloud, especially on software-defined networking (SDN) controllers. Moreover, with the development of the fifth generation (5G) of mobile communication technology, the network scale will become larger and larger, and more and more requirements will be put forward for BGP. Therefore, the reliability of BGP routes is very important, especially for core boundary nodes that control millions of BGP routes. Therefore, to ensure the network security and service availability, it is desirable and valuable that the BGP node itself can automatically detect and repair black holes.

Current solutions for solving black holes as mentioned above are only available for just a simple environment, and can only detect some of the black holes and have many limitations. Also, these current solutions are almost only based on checking the routes reversely. It is not reliable, because it cannot find out the fault routes generated by routing protocols themselves, and it is hard to find the misconfigurations by administrators. Therefore, currently, there is no thorough solution which can achieve an auto-detecting and repairing of the BGP black holes in a reliable and real time manner.

The present disclosure proposes an improved solution that can at least automatically detect and resolve abnormal routes, especially the black hole routes, in real time. Hereinafter, the solution of the present disclosure will be described in detail with reference to FIGS. 1 to 8.

Figure 1:
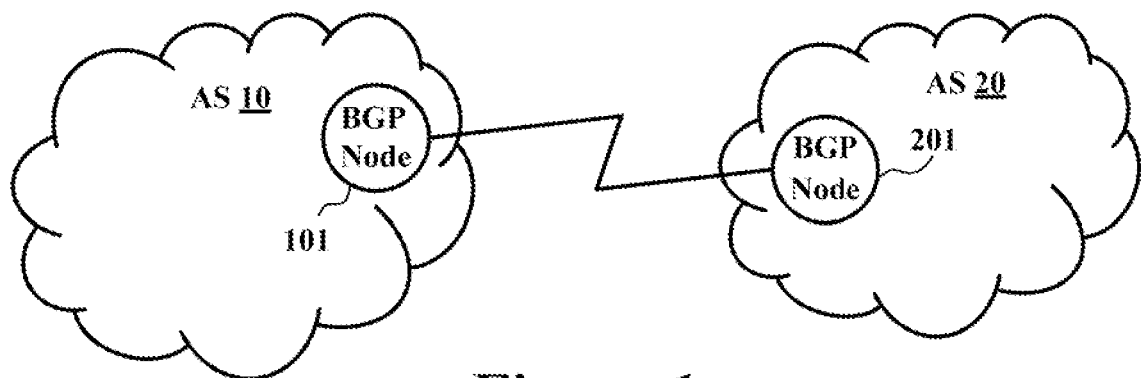
FIG. 1 is a schematic diagram showing an exemplary environment in which an embodiment of the present disclosure may be applied.

FIG. 1 is a schematic diagram showing an exemplary environment in which an embodiment of the present disclosure may be applied. As shown, the exemplary environment includes an autonomous system (AS) 10 and an AS 20. The AS 10 includes a BGP node (or network device) 101, and the AS 20 includes a BGP node 201. An autonomous system may be a network unit that has the right to decide autonomously which kind of routing protocol should be used in the system. The network unit can be a simple network or a network group controlled by one or more network administrators. An autonomous system sometimes may also be referred to as a routing domain. A BGP node refers to a node deployed with BGP protocol. A BGP node can be a router, a switch, a server, a base station, and the like. Embodiments of the present disclosure may be applied to the BGP node 101 on the left side of FIG. 1, and/or the BGP node 201 on the right side of FIG. 1. As an illustrative example, AS 10 may be a service provider network and AS 20 may be a user network. The BGP nodes 101 and 201 may be border gateway nodes that run the BGP protocol to connect the AS 10 and the AS 20. It should be noted that embodiments of the present disclosure are not limited to border gateway nodes, and may be applied to other nodes as well. Additionally, although embodiments of the present disclosure are described in the context of the BGP protocol, those skilled in the art will appreciate that the principles of the present disclosure are also applicable to nodes employing other protocols (e.g., a similar protocol to be developed in the future) with the same functionality (interconnecting an autonomous system). Moreover, it should be noted that as technology advances, BGP protocols or other protocols having the same functionality may also be deployed to other devices (e.g., handheld terminals, IoT devices, such as smart home devices, etc.).

Figure 2:
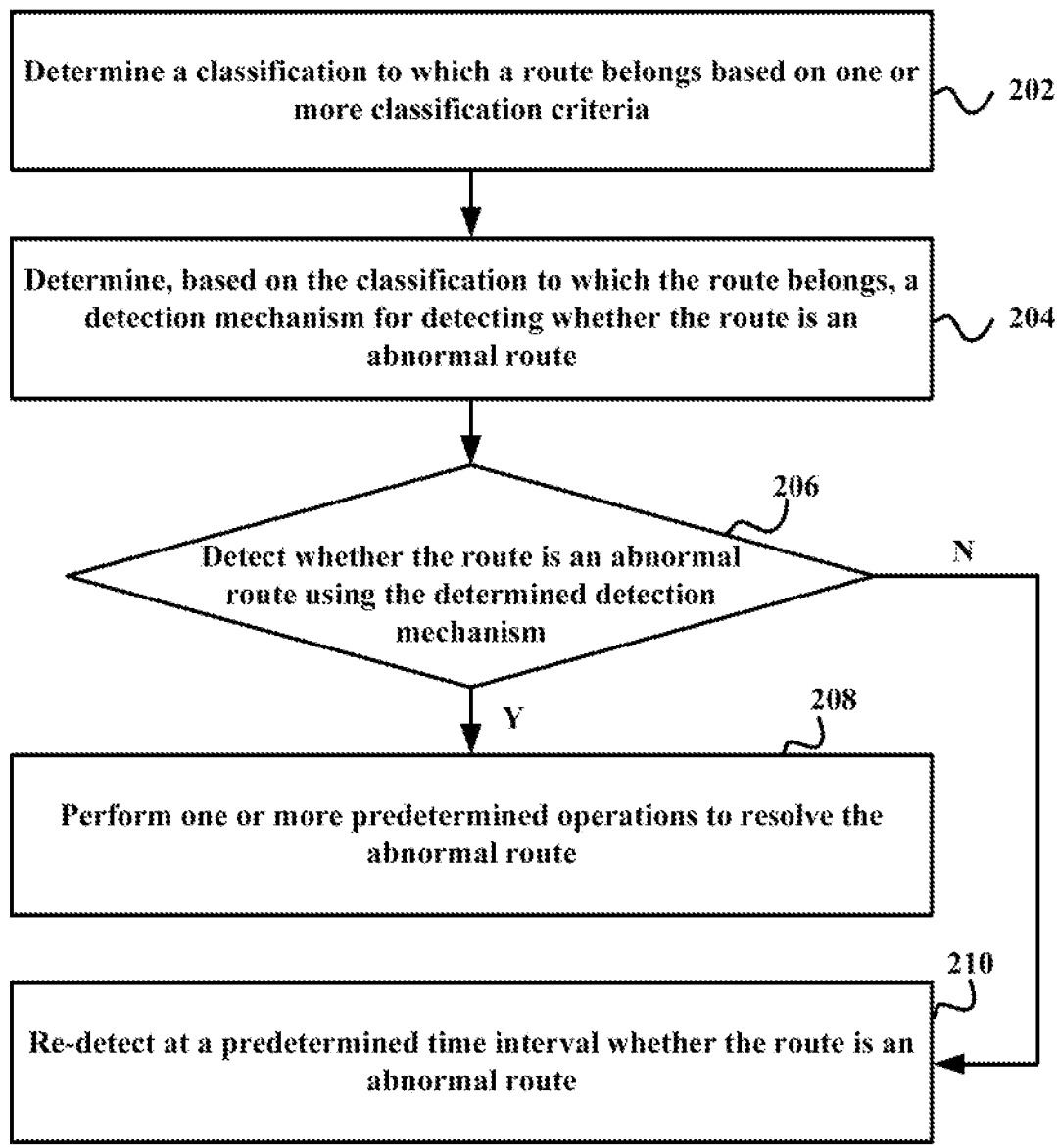
FIG. 2 is a flow chart showing a method in accordance with an embodiment of the present disclosure.

FIG. 2 is a flow chart showing a method in accordance with an embodiment of the present disclosure. The method can be implemented by a network device deployed with a BGP protocol or other protocols having the same functionality. At block 202, a classification to which a route belongs is determined based on one or more classification criteria. The route may be generated by the network device or may be received from an external device (e.g., a router, switch, etc.). As a first example, the classification criteria may be a route filtering policy. The route filtering policy may be any one or more of: a prefix filtering; a route-map filtering; an access-list filtering; an as-path filtering; and a self-defined filtering. For example, if a user (such as an administrator) only wants to detect one route (10.10.10.10/32), the user can generate the following prefix-filter: ip prefix-list 1 permit 10.10.10.10/32. In this way, the network device can only detect the route that satisfies the "prefix-list 1".

As a second example, the classification criteria may be the route origin. The route origin can be any of the following: Interior Gateway Protocol (IGP); External Gateway Protocol (EGP); and a protocol introduced from other routing protocols (e.g., Intermediate System to Intermediate System (ISIS) protocol, Open Shortest Path First (OSPF), etc.), via a route redistribution, that is, the attribute of the route origin is "Incomplete". As a third example, the classification criteria may be a route type. The route type can be any of the following: a connected route; a static route; a default route; an OSPFv2 route; an OSPFv3 route; a RIP route; a RIPng route; an ISIS route; an Internal Gateway Routing Protocol, IGRP, route; an Enhanced Internal Gateway Routing Protocol, EIGRP, route; and a BGP route, and other protocol type routes. As a fourth example, the classification criteria may be a trust rating. This trust rating can be obtained according to the route dampening mechanism (see RFC2439). As a fifth example, the classification criteria can be a self-defined classification criterion. The self-defined classification criterion can be set by the user according to a specific application scenario. As a sixth example, the classification criteria may be a combination of any of the above-described route filtering policy, route origin, route type, trust rating, and self-defined classification criterion.

The one or more classification criteria upon which the classification is performed at block 202 may be predefined or may be set by the user. In the latter case, since the user can select different classification criteria for detection, it is possible to flexibly process the routes generated or received by the network device. It should be noted that when classifying a plurality of routes, it may be possible to only detect those routes that satisfy the classification criteria, as exemplified in describing the first example. However, it is also possible to detect all routes. At this time, different or the same detection mechanisms may be used to detect the routes belonging to different classification, respectively.

At block 204, based on the classification to which the route belongs, a detection mechanism for detecting whether the route is an abnormal route is determined. An abnormal route can be a black hole route or any other route that does not work properly. As a first example, the determined detection mechanism may be to detect the reachability of the route using an Internet packet explorer (PING). For example, the destination of the route can be probed with a ping command (e.g., an IPv4/IPv6 ping). As a second example, the determined detection mechanism may be to detect the reachability of the route using a trace route. For example, a traceroute command (e.g., IPv4/IPv6 traceroute) can be used to obtain information about all routers between the network device and the destination of the route. As a third example, the determined detection mechanism may be to detect the reachability of the route for the destination of the route using a real traffic or simulating the real traffic. For example, the detection mechanism can be implemented in two steps. In a first step, a real or simulated connection establishment request is sent to the destination of the route. The sent connection establishment request may be Hypertext Transfer Protocol (HTTP), Simple Mail Transfer Protocol (SMTP), Secure Shell Protocol (SSH), Telecommunication Network Protocol (TELNET), and the like. In a second step, the reachability of the route is determined based on whether a connection can be established with the destination. Since the real or simulated connection establishment request is sent to the destination through the route, if a connection can be established with the destination, it can be determined that the route is reachable. On the other hand, if a connection cannot be established with the destination, it can be determined that the route is unreachable. For example, a default port 80 can be used to simulate an HTTP request to establish an HTTP connection with the destination based on Transmission Control Protocol (TCP). If a connection can be established, it can be determined that the route to the destination is normal (e.g., not a black hole route). In this way, since the route detection is performed using a real traffic or by simulating the real traffic, it is possible to find the fault routes generated by routing protocols themselves, and/or the fault routes due to misconfigurations by administrators, thereby improving the reliability of the route detection. As a fourth example, the determined detection mechanism may be a self-defined detection mechanism. The self-defined detection mechanism can be set by the user according to a specific application scenario.

The correspondence between the classification to which the route belongs and the detection mechanism may be predefined or may be set by a user (e.g., an administrator). In the latter case, the user can flexibly set the correspondence according to specific deployment scenarios, performance requirements, and other factors. For example, for a BGP route whose route origin is an IGP (indicating that the route originates from the IGP), the detection mechanism of the first example described above (i.e., using ping) may be employed. For a BGP route whose route origin is an EGP (indicating that the route originates from EGP), the detection mechanism of the third example above (i.e., using a real traffic or by simulating the real traffic) may be employed. Thus, for a certain type of route, the user can select the detection mechanism that is most suitable for the type of route. This can improve the detection accuracy and performance.

Figure 3:
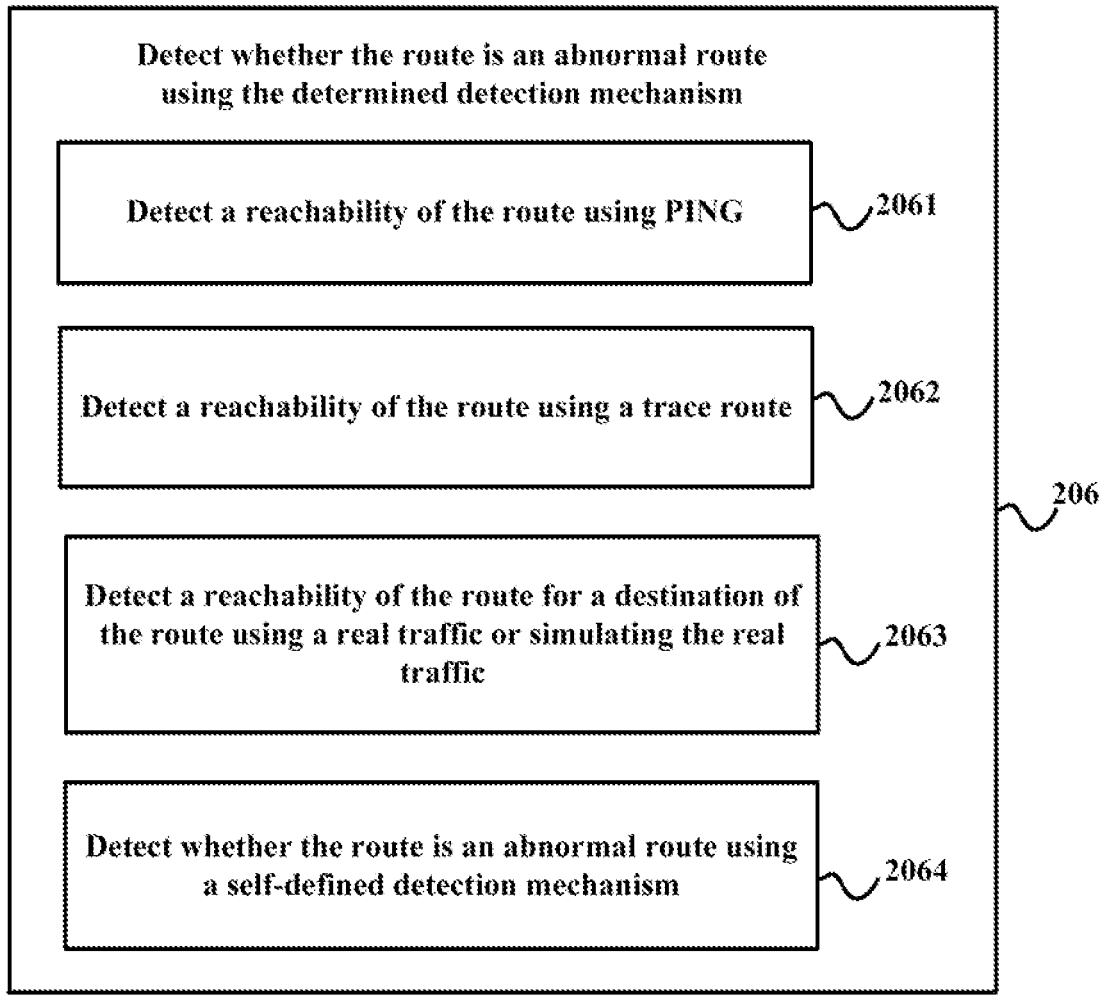
FIG. 3 is a flow chart for illustrating the method of FIG. 2.
Figure 4:
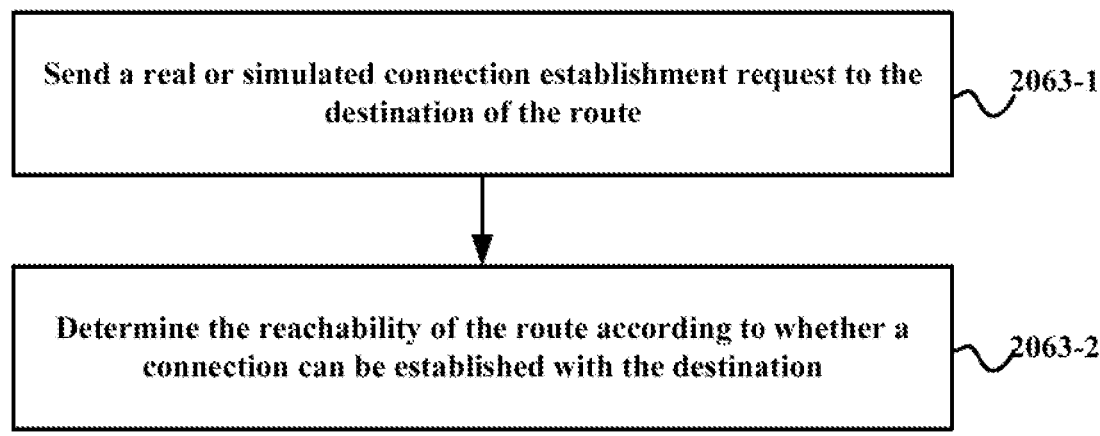
FIG. 4 is another flow chart for illustrating the method of FIG. 2.

At block 206, the determined detection mechanism is employed to detect if the route is an abnormal route. As shown in FIG. 3, block 206 can be implemented as blocks 2061, 2062, 2063, or 2064. At block 2061, the accessibility of the route is detected using an Internet packet explorer (PING). Block 2061 corresponds to the first example of block 204. At block 2062, a trace route is employed to detect the reachability of the route. Block 2062 corresponds to the second example of block 204. At block 2063, the reachability of the route is detected for the destination of the route by using a real traffic or by simulating the real traffic. For example, block 2063 can be implemented as blocks 2063-1 and 2063-2 of FIG. 4. At block 2063-1, a real or simulated connection establishment request is sent to the destination of the route. At block 2063-2, the reachability of the route is determined based on whether a connection can be established with the destination. Block 2063 corresponds to the third example of block 204. At block 2064, a self-defined detection mechanism is employed to detect if the route is an abnormal route. Block 2064 corresponds to the fourth example of block 204.

Figure 5:
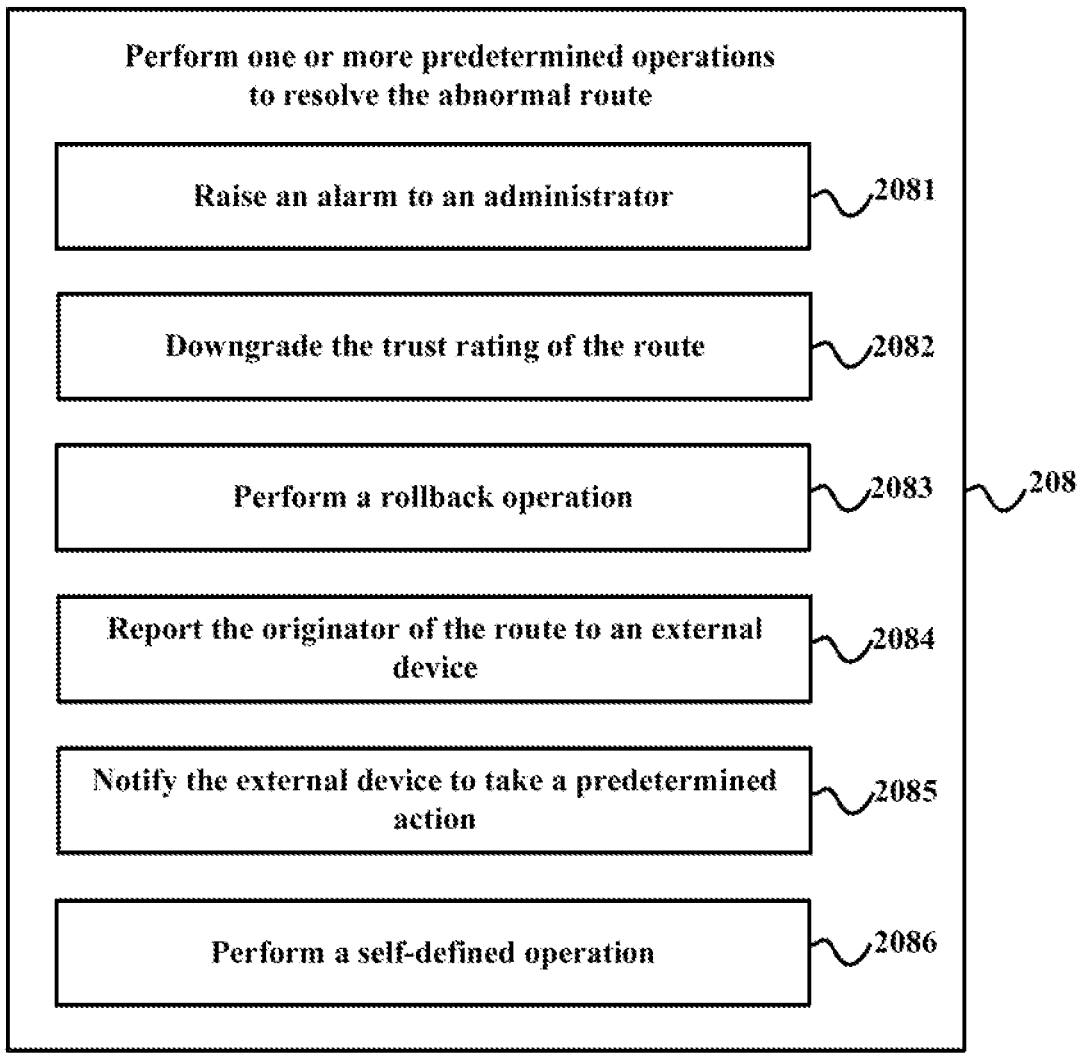
FIG. 5 is another flow chart for illustrating the method of FIG. 2.

If it is detected at block 206 that the route is an abnormal route, then one or more predetermined operations are performed at block 208 to resolve the abnormal route. As shown in FIG. 5, block 208 can be implemented as any one or more of blocks 2081 through 2086. At block 2081, an alert is raised to the administrator. The alert can indicate which detected route(s) is an abnormal route(s). This enables the administrator to take the respective actions. Alarms can take various forms such as visual signals, audible signals, and the like. At block 2082, the trust rating of the route is downgraded. As mentioned earlier, the trust rating can be obtained according to the route dampening mechanism (see RFC2439). When the trust rating is below the threshold, a dampening action can be taken (e.g., inhibiting the route). When the trust rating is above the threshold, an affirmative action can be taken (e.g., stopping inhibiting the route).

Figure 6:
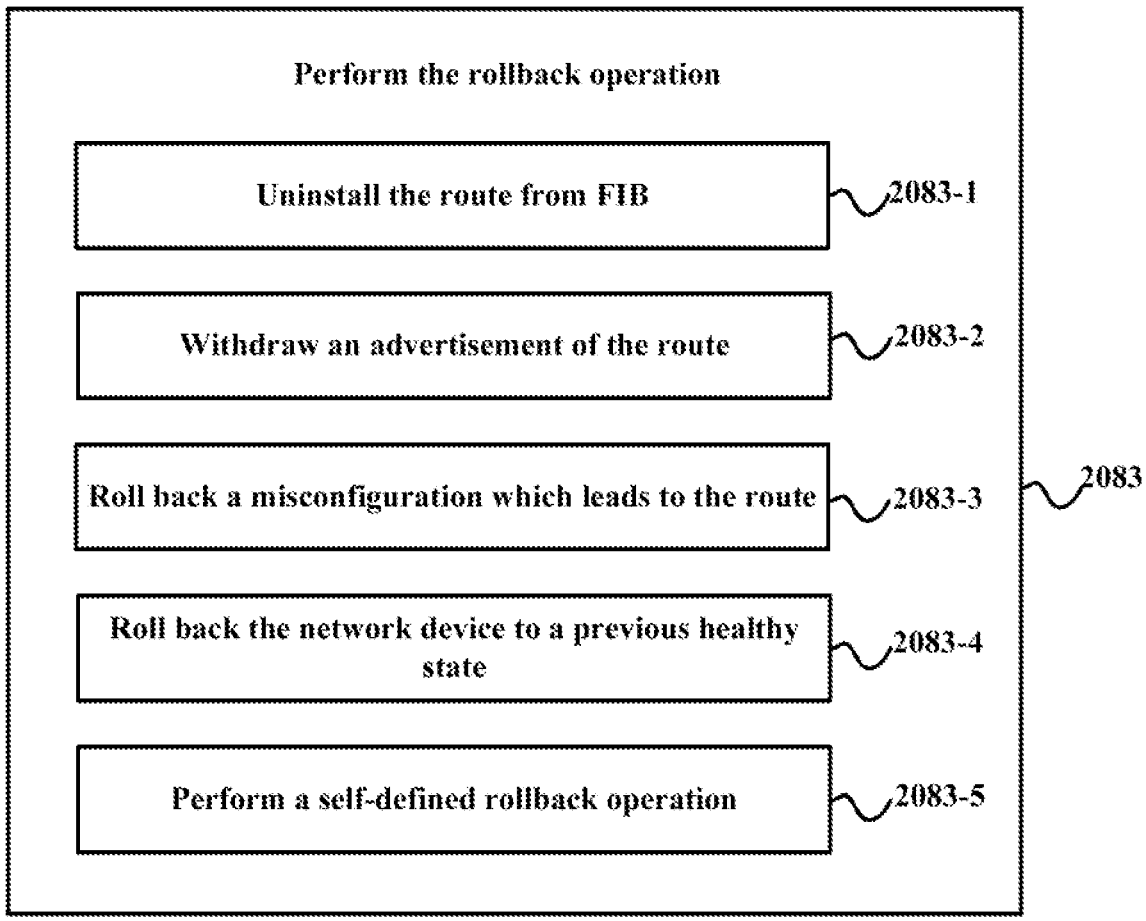
FIG. 6 is another flow chart for illustrating the method of FIG. 2.

At block 2083, a rollback operation is performed. As shown in FIG. 6, block 2083 can be implemented as any one or more of blocks 2083-1 through 2083-5. At block 2083-1, the route is uninstalled from a forwarding information base (FIB). The uninstallation can refer to a removal from the hardware of the network device. At block 2083-2, the advertisement of the route is withdrawn. This corresponds to the case where the network device has previously advertised the route that was then normal to the external device. Since the route has changed from a normal route to an abnormal route at this time, the network device can send an advertisement again to withdraw the route. It should be noted that blocks 2083-1 and 2083-2 can generally be used in combination. At block 2083-3, the misconfiguration that caused the route is rolled back. For example, one can roll back to the configuration before the misconfiguration occurred, thereby withdrawing the misconfiguration. At block 2083-4, the network device is rolled back to a previous healthy state. The previous healthy state may be the most recent healthy state or a healthy state prior to the most recent healthy state. At block 2083-5, a self-defined rollback operation is performed. The self-defined rollback operation can be set by the user according to a specific application scenario.

At block 2084, the originator of the route is reported to an external device (e.g., an IGP node). In this way, the external device can know which node generated the abnormal route. At block 2085, the external device is notified to take a predetermined action. The predetermined action may be any one or more of the following: deleting the route at the external device (e.g., an IGP node); notifying, by the external device, the neighbor of the external device to delete the route; reporting, by the external device, the route to an administrator of the external device; and performing a self-defined action. This self-defined action can be set by the user according to a specific application scenario. At block 2086, a self-defined action is performed. The self-defined action can be set by the user according to a specific application scenario. At least in the above blocks 2082 to 2085, since the network device automatically performs a predetermined operation to resolve the routing abnormality without human intervention, a large amount of labor cost can be saved.

Alternatively, one or more predetermined operations performed at block 208 may be determined based on the classification to which the route belongs. The correspondence between the two can be predefined or can be set by the user. As an example, for a BGP route whose route origin is an IGP (indicating that the route originates from the IGP), the detection mechanism of the first example of the above block 204 may be employed (i.e., using ping), and block 2083 may be employed as the predetermined operation for resolving the routing abnormality. For a BGP route whose route origin is an EGP (indicating that the route originates from EGP), the detection mechanism of the third example of block 204 above (i.e., using a real traffic or by simulating the real traffic) may be employed, and blocks 2082 and 2084 may be employed as the predetermined operation for resolving the routing abnormality.

On the other hand, if the route detected at block 206 is not an abnormal route, then at block 210 it is re-detected at a predetermined time interval whether the route is an abnormal route. As an illustrative example, a timer with a periodicity of a timing value T can be initiated. It can be re-detected whether the route is an abnormal route every time the timer expires. This detection has been described in details with respect to block 206, and thus its details will not be described again. If the re-detection finds that the route has become an abnormal route, block 208 may be performed. If the re-detection finds that the route is still not an abnormal route, it continues to re-detect whether the route is an abnormal route at the predetermined time interval. Since the re-detection is periodically performed on the route that has been detected as a normal route, whenever such a normal route becomes an abnormal route, it can be detected and resolved in near real time. This can avoid a large-scale collapse of network services.

In another embodiment, if it is detected at block 206 that the route is not an abnormal route, the route may also be advertised to an external device. For example, the route may first enter a routing process. This can be conducted according to a routing rule. The route can then be advertised to the neighbor according to a route advertisement rule. It should be noted that the implementation of the routing and advertising process is not particularly limited in this disclosure, but various existing routing and advertising schemes may be employed. It should be noted that the functions noted in the blocks of all the flowcharts mentioned above may also occur in an order different from that noted in the drawings. For example, two consecutive blocks may be executed substantially in parallel, and they may sometimes be executed in a reverse order, depending upon the functionality involved.

Alternatively, a user (e.g., an administrator) may enable or disable the execution of the method illustrated in FIG. 2 by the network device. For example, in an example of the service provider network and user network described with respect to FIG. 1, the user may enable or disable the execution of the method illustrated in FIG. 2 on either or both sides of the service provider side and the user side. Optionally, for a BGP node, the user may enable the execution of the method shown in FIG. 2 for all BGP neighbors of the BGP node, or enable the execution of the method shown in FIG. 2 only for some of the BGP neighbors, depending on the specific application scenario. In the latter case, the user has the flexibility to detect only the portion of the route that is most concerned with. Alternatively, when the user enables the execution of the method illustrated in FIG. 2, there may be a default configuration for the route classification, detection, and abnormality resolution. For a specific application scenario, the user can modify the default configuration or add a new configuration.

Figure 7:
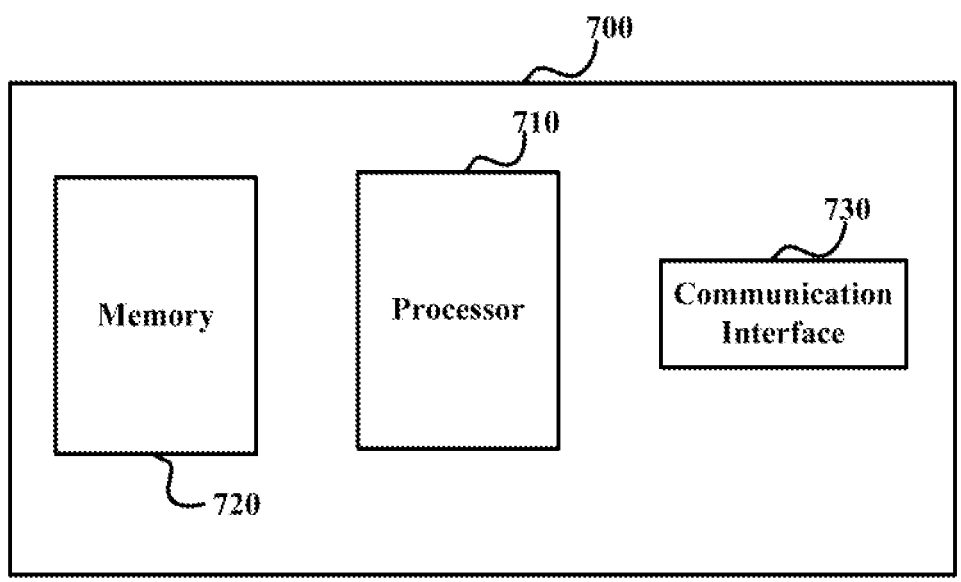
FIG. 7 is a simplified block diagram showing an device suitable for implementing some embodiments of the present disclosure.

FIG. 7 is a simplified block diagram showing a device suitable for implementing some embodiments of the present disclosure. For example, the network device described above can be implemented by a device 700. As shown, the device 700 can include a processor 710, a memory 720 that stores programs, and a communication interface 730 for communicating data with other external devices via wired and/or wireless communication.

The program stored by the memory 720 includes program instructions that, when executed by the processor 710, enable the device 700 to operate in accordance with an exemplary embodiment of the present disclosure, as discussed above. That is, exemplary embodiments of the present disclosure may be implemented at least in part by a computer software executable by the processor 710, or by hardware, or by a combination of software and hardware.

Memory 720 can be of any type suitable for local technology environments and can be implemented using any suitable data storage technology, such as semiconductor-based memory devices, flash memories, magnetic memory devices and systems, optical memory devices and systems, fixed memories, and removable storage. Processor 710 can be of any type suitable for the local technology environment and can include, by way of non-limiting example, one or more of: a general purpose computer, a special purpose computer, a microprocessor, a digital signal processor (DSP), and a processor based on a multi-core processor architecture.

Figure 8:
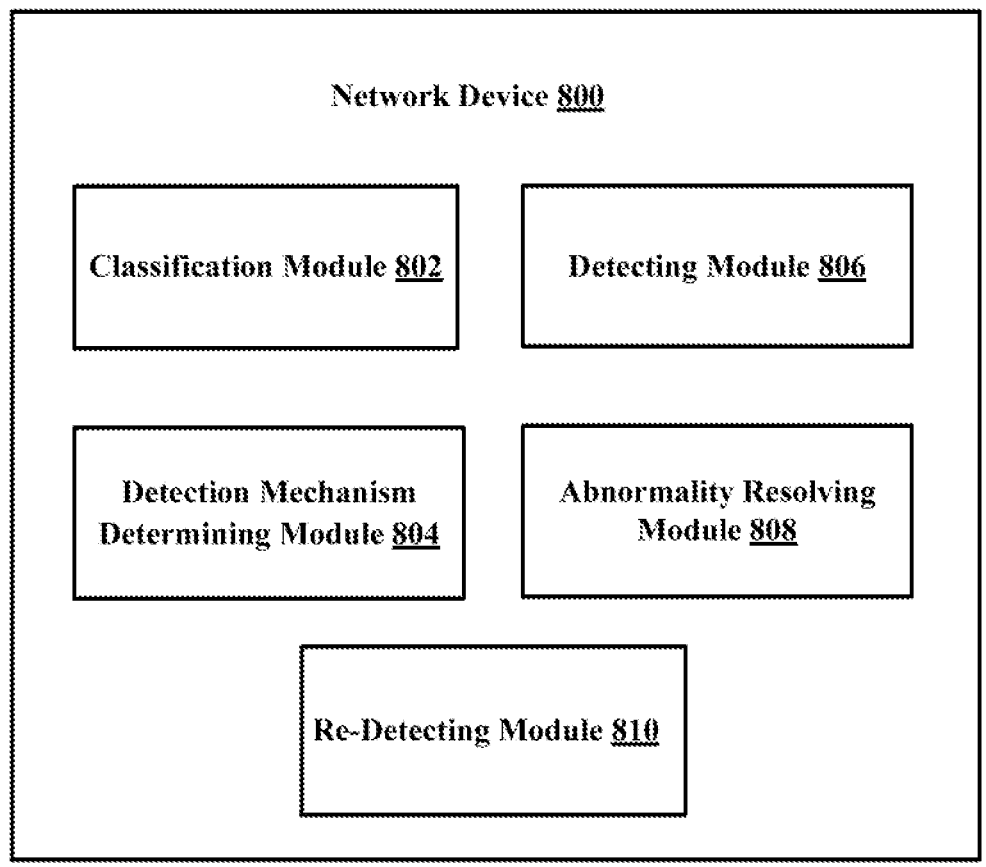
FIG. 8 is a block diagram showing a network device in accordance with an embodiment of the present disclosure.

FIG. 8 is a block diagram showing a network device in accordance with an embodiment of the present disclosure. As shown, the network device 800 includes a classification module 802, a detection mechanism determining module 804, a detecting module 806, and optionally an abnormality resolving module 808, and a re-detecting module 810. The classification module 802 can be configured to determine a classification to which a route belongs based on one or more classification criteria, as described with reference to block 202. The detection mechanism determining module 804 can be configured to determine a detection mechanism for detecting whether the route is an abnormal route based on the classification to which the route belongs, as described with reference to block 204. The detecting module 806 can be configured to detect whether the route is an abnormal route using the determined detection mechanism, as described with reference to block 206. The abnormality resolving module 808 can be configured to perform one or more predetermined operations to resolve the abnormal route upon detecting that the route is an abnormal route, as described with reference to block 208. The re-detecting module 810 can be configured to re-detect whether the route is an abnormal route at a predetermined time interval upon detecting that the route is not an abnormal route, as described with reference to block 210.

In general, various exemplary embodiments can be implemented in hardware or special purpose circuits, software, logic, or any combination thereof. For example, some aspects may be implemented in hardware, while other aspects may be implemented in firmware or software executable by a controller, microprocessor or other computing devices, although the disclosure is not limited thereto. Although various aspects of the exemplary embodiments of the present disclosure may be shown and described as a block diagram, a flowchart, or some other graphical representation, it should be well understood that, by way of non-limiting example, the blocks, devices, systems, techniques, or methods described herein may be implemented in hardware, software, firmware, special purpose circuits or logic, general purpose hardware or controllers, or other computing devices, or some combinations thereof.

As such, it should be understood that at least some aspects of the exemplary embodiments of the present disclosure may be practiced in various components such as integrated circuit chips and modules. Accordingly, it should be appreciated that the exemplary embodiments of the present disclosure can be implemented in an apparatus embodied as an integrated circuit, which can include circuits (and possibly firmware) for embodying at least one or more of a data processor, a digital signal processor, a baseband circuit, and a radio frequency circuit configurable to operate in accordance with an exemplary embodiment of the present disclosure.

It should be understood that at least some aspects of the exemplary embodiments of the present disclosure may be embodied in computer-executable instructions executed by one or more computers or other devices, such as embodied in one or more program modules. Generally, program modules include routines, programs, objects, components, data structures, and the like that perform particular tasks or implement particular abstract data types when executed by a processor in a computer or other devices. The computer executable instructions may be stored on a computer readable medium such as a hard disk, an optical disk, a removable storage medium, a solid state memory, a random access memory (RAM), and the like. Those skilled in the art will appreciate that the functionality of the program modules can be combined or distributed as desired in various embodiments. Additionally, the functions may be embodied as a whole or partly in a firmware or hardware equivalents such as integrated circuits, field programmable gate arrays (FPGAs), and the like.

The present disclosure includes any novel feature or a combination of features disclosed herein either explicitly or in any generalized form. Various modifications and adaptations to the above described embodiments of the present disclosure will become apparent to those skilled in the art in light of the above description when read in conjunction with the drawings. However, any and all modifications will still fall within the scope of the non-limiting and exemplary embodiments of the disclosure.

| Abbreviation | Explanation |
| --- | --- |
| BGP | Border Gateway Protocol |
| IGP | Interior Gateway Protocol |
| IPv4 | Internet Protocol Version 4 |
| IPv6 | Internet Protocol Version 6 |
| EGP | External Gateway Protocol |
| MPLS | Multi-protocol Label Switching |
| PE | Provider Edge |
| OSPF | Open Shortest Path First |
| OSPFv2 | OSPF version Two |
| OSPFv3 | OSPF version Three |
| RIP | Routing Information Protocol |
| RIPng | RIP next generation |
| ISIS | Intermediate System to Intermediate System |
| HTTP | Hyper Text Transfer Protocol |
| SMTP | Simple Mail Transfer Protocol |
| SSH | Secure Shell |
| TELNET | Telecommunication Network Protocol |
| 5G | Fifth-generation |
| SDN | Software Defined Network |

What is claimed is:

1. A method in a network device, comprising:
determining a classification to which a route belongs based on one or more classification criteria;
determining, based on the classification to which the route belongs, a detection mechanism for detecting whether the route is an abnormal route; and
detecting whether the route is an abnormal route using the determined detection mechanism;
the determined detection mechanism detecting a reachability of the route for a destination of the route by one of using real traffic and simulating the real traffic;
the detecting a reachability of the route for a destination of the route by the one of using real traffic and by simulating the real traffic, comprises:
sending a real or simulated connection establishment request to the destination of the route, the connection establishment request using any one of: Hypertext Transfer Protocol (HTTP), Simple Mail Transfer Protocol (SMTP), Secure Shell Protocol (SSH), and Telecommunication Network Protocol (TELNET); and
determining the reachability of the route according to whether a connection can be established with the destination.

2. The method of claim 1, wherein the determined detection mechanism is a traffic-based detection mechanism, and wherein the reachability of the route is detected for a destination of the route.

3. The method of claim 1, wherein the determined detection mechanism is one of:
detecting a reachability of the route using an Internet packet explorer PING;
detecting a reachability of the route using a trace route; and
a self-defined detection mechanism.

4. The method of claim 1, further comprising:
performing one or more predetermined operations to resolve the abnormal route, upon detecting that the route is an abnormal route; and
re-detecting at a predetermined time interval whether the route is an abnormal route, upon detecting that the route is not an abnormal route.

5. The method of claim 4, wherein performing one or more predetermined operations comprises one or more of:
raising an alarm to an administrator;
downgrading the trust rating of the route;
performing a rollback operation;
reporting the originator of the route to an external device;
notifying the external device to take a predetermined action; and
performing a self-defined operation.

6. The method of claim 5, wherein performing the rollback operation comprises one or more of:
uninstalling the route from a forwarding information base, FIB;
withdrawing an advertisement of the route;
rolling back a misconfiguration which leads to the route;
rolling back the network device to a previous healthy state; and
performing a self-defined rollback operation.

7. The method of claim 5, wherein the predetermined action comprises one or more of:
deleting the route at the external device;
notifying, by the external device, the neighbor of the external device to delete the route;
reporting, by the external device, the route to an administrator of the external device; and
performing a self-defined action.

8. The method of claim 1, further comprising:
advertising the route to an external device, upon detecting that the route is not an abnormal route.

9. The method of claim 1, wherein the route is generated by the network device or received from an external device.

10. The method of claim 1, wherein the one or more classification criteria are one or more of:
a route filtering policy;
a route origin;
a route type;
a trust rating; and
a self-defined classification criterion.

11. The method of claim 10, wherein the route filtering policy comprises:
a prefix filtering;
a route-map filtering;
an access-list filtering;
an as-path filtering; and
a self-defined filtering.

12. The method of claim 10, wherein the route origin comprises:
Interior Gateway Protocol, IGP;
External Gateway Protocol, EGP; and a protocol introduced from other routing protocols via a route redistribution.

13. The method of claim 10, wherein the route type comprises:
    a connected route,
    a static route,
    a default route,
    an Open Shortest Path First Version Two, OSPFv2, route;
    an Open Shortest Path First Version Three, OSPFv3, route;
    a Routing Information Protocol, RIP, route;
    a Routing Information Protocol next generation, RIPng, route;
    an Intermediate System to Intermediate System, ISIS, route;
    an Internal Gateway Routing Protocol, IGRP, route;
    an Enhanced Internal Gateway Routing Protocol, EIGRP, route; and
    a Border Gateway Protocol, BGP, route.

14. The method of claim 10, wherein the trust rating is obtained from a route dampening mechanism.

15. The method of claim 1, wherein the abnormal route is a black hole route.

16. The method of claim 1, wherein the network device is one of the following deployed with BGP:
    a router;
    a switch;
    a server; and
    a base station.

17. A network device, comprising:
    at least one processor; and
    at least one memory, containing instructions executable by the at least one processor, whereby the network device is configured to:
        determine a classification to which a route belongs based on one or more classification criteria;
        determine, based on the classification to which the route belongs, a detection mechanism for detecting whether the route is an abnormal route; and
        detect whether the route is an abnormal route using the determined detection mechanism,
        the determined detection mechanism being configured to detect a reachability of the route for a destination of the route by one of using real traffic and simulating the real traffic;
        the detecting a reachability of the route for a destination of the route by one of using the real traffic and by simulating the real traffic, the determined detection mechanism being further configured to:
            send a real or simulated connection establishment request to the destination of the route, the connection establishment request using any one of: Hypertext Transfer Protocol (HTTP), Simple Mail Transfer Protocol (SMTP), Secure Shell Protocol (SSH), and Telecommunication Network Protocol (TELNET); and
            determine the reachability of the route according to whether a connection can be established with the destination.

18. The network device of claim 17, wherein the determined detection mechanism is a traffic-based detection mechanism, and wherein the reachability of the route is detected for a destination of the route.

19. The network device of claim 17, wherein the determined detection mechanism is one of:
    detect a reachability of the route using an Internet packet explorer PING;
    detect a reachability of the route using a trace route; and
    a self-defined detection mechanism.

* * * * *